Nov. 2, 1926.
E. W. KNUTH
POWER GRINDER
Filed June 15, 1925
1,605,547
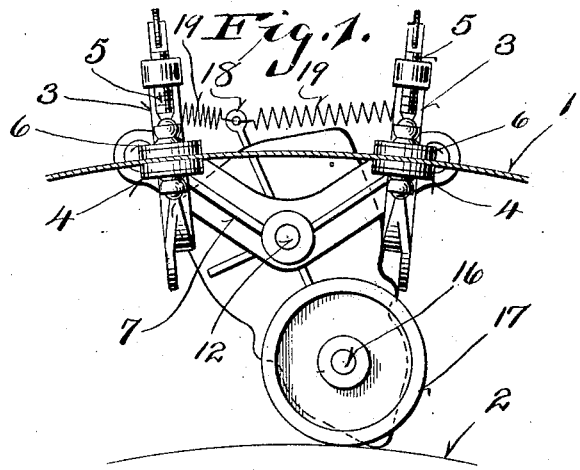
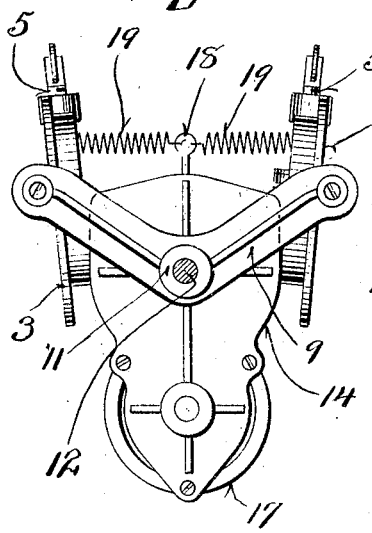
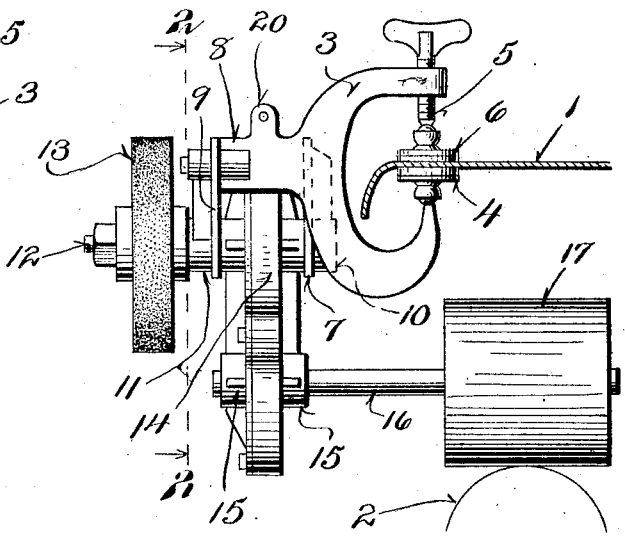
Inventor
Eugene W. Knuth Patented Nov. 2, 1926.

1,605,547

UNITED STATES PATENT OFFICE.

EUGENE W. KNUTH, OF MILWAUKEE, WISCONSIN.

POWER GRINDER.

Application filed June 15, 1925. Serial No. 37,199.

This invention relates to power grinders. Objects of this invention are to provide power grinders which may be quickly attached to an automobile and receives power from the automobile, but which does not require any alteration of the automobile structure in order to adapt such automobile to the use of this grinder.

Further objects are to provide a grinder which is adapted to be driven directly from the rear wheel of an automobile, which is spring pressed into engagement with such wheel, and which may be clamped to the mud guard in a secure and firm manner.

An embodiment of the invention is shown in the accompanying drawings, in which:

Figure 1 is a sectional view through the mud guard looking towards the outside of the machine, and showing the grinder in position.

Figure 2 is a view from the front of the grinder, such view being partly in section and corresponding to a section on the line 2—2 of Figure 3.

Figure 3 is a side view of the device, the mud guard being shown in section.

Referring to the drawings, it will be seen that the usual mud guard 1 has been shown associated with the rear wheel whose tire is indicated at 2. The power grinder comprises a frame having a pair of spaced U-shaped members 3. One arm of these U-shaped members turns upwardly and is provided with a swivel bearing 4. The other arm has a thumb screw 5 threaded therethrough and provided with a swivel bearing 6.

The mud guard 1 is clamped between the bearings 4 and 6 of each of the U-shaped members, as shown in Figures 1 and 3. These U-shaped members are joined integrally by means of a downwardly arched body portion 7, as shown in Figures 1 and 2. The forward ends of the device are provided with projecting portions 8, as shown in Figure 3, and a corresponding arched member 9 is detachably bolted to these forwardly projecting portions. The members 7 and 9 are provided with bearings 10 and 11, respectively, which receive the shaft 12 of the grinding wheel 13. This shaft also carries the casing 14 which houses the driving gears for the grinder. The lower end of the casing is provided with bearings 15 having an inwardly projecting shaft 16. This inwardly projecting shaft is provided with a pulley in the nature of an elongated drum 16 which is adapted to engage the tire 2 of the rear wheel of the automobile.

In order to hold the drum 17 in frictional engagement with the tire 2, such drum is spring urged by mechanism herein described. This mechanism comprises a lug 18 rigidly formed with the casing 14, as shown in Figures 1 and 2. Springs 19 extend from opposite sides of the lug 18 and are secured to corresponding lugs 20 formed on the U-shaped members 3, as shown most clearly in Figure 3. Thus the springs 19 tend to hold the casing 14 in its central position. However, in applying the device, the casing is rocked to one side or the other, such for instance as shown in Figure 1, and the drum 17 is placed in contact with the tire 2. The springs retain such drum yieldingly in frictional engagement with the tire. The thumb screws 5 are tightened and clamp the U-shaped members and consequently the body portion in rigid relation to the mud guard 1, as shown in Figures 1 and 2. It is merely necessary to jack up that portion of that side of the automobile upon which the grinder is secured. The rear wheel is then driven from the engine and the grinder is correspondingly driven. It will be seen that any suitable type of mechanism may be employed for connecting the shafts 16 and 12.

It is to be particularly noted that no alteration is required in the automobile structure in order to adapt it for driving relation with the grinder, it being merely necessary to jack up one side of the rear of the automobile. Thus it will be seen that a grinder has been provided which may be readily attached to the rear mud guard of an automobile and driven from the engine of such machine without any alteration whatsoever.

It will be seen further that the device may be most easily applied to and removed from the automobile and consequently may be carried as a portion of the equipment of the automobile and is adapted for instant use as the occasion demands.

Although the invention has been described in considerable detail, it is to be understood that the invention may be variously embodied and is, therefore, to be limited only as claimed.

I claim:

1. A grinder for use on an automobile having rear mud guards, said grinder comprising a pair of spaced U-shaped clamps adapted to engage the mud guard at spaced points, said clamps being joined by an intermediate body portion, a casing pivoted to said intermediate body portion and having a shaft coaxial with the pivot point, a grinding wheel carried by said shaft, a second shaft paralleling said first mentioned shaft and carried by an outwardly projecting portion of said casing, said shafts being operatively connected, a drum carried by said second shaft and adapted to engage the tire of the rear wheel of said automobile, and yielding means tending to rock said casing about said first mentioned shaft to yieldingly press said drum in engagement with the tire.

2. A grinder for use on an automobile having rear mud guards, said grinder comprising a pair of spaced U-shaped clamps adapted to engage the mud guard at spaced points, said clamps being joined by an intermediate body portion, a casing pivoted to said intermediate body portion and having a shaft coaxial with the pivot point, a grinding wheel carried by said shaft, a second shaft paralleling said first mentioned shaft and carried by an outwardly projecting portion of said casing, said shafts being operatively connected, a drum carried by said second shaft and adapted to engage the tire of the rear wheel of said automobile, and springs connected to said casing and to said clamps, said springs tending to hold said casing in central position with reference to said clamps and permitting said casing to be deflected in either direction so that the drum may bear upon the tire in a yielding manner either in advance of or behind the pivotal point of the casing, said clamps having swively joined feet, whereby said feet will conform to the difference in angularity of the mud guards at the two points of engagement thereof.

In testimony that I claim the foregoing I have hereunto set my hand at Milwaukee, in the county of Milwaukee, and State of Wisconsin.

EUGENE W. KNUTH.